UNITED STATES PATENT OFFICE.

JOSEPH TURNER AND HARRY DEAN, OF HUDDERSFIELD, ENGLAND.

MANUFACTURE OF BLACK COLORING-MATTERS.

1,014,982.     Specification of Letters Patent.     Patented Jan. 16, 1912.

No Drawing.     Application filed April 24, 1911. Serial No. 622,909.

*To all whom it may concern:*

Be it known that we, JOSEPH TURNER and HARRY DEAN, subjects of King George V of Great Britain, residing in Huddersfield, in the county of York, England, have invented certain new and useful Improvements in the Manufacture of Black Coloring-Matters, of which the following is a specification.

In the specification of our prior Patent No. 987417 is described a preparation of direct cotton dyestuffs by using ortho and para chlor anilins as a starting point. We have now found that further valuable dyestuffs are produced by using, as an end component, chlor meta phenylene diamin.

In the production of direct dyeing cotton dyestuffs according to our invention, we combine with one molecule of the neutral salt of amido naphthol disulfonic acid (1.8.3.6) (H acid) one molecule of ortho or para chlor diazo benzol, or a mixture of the two, taking care that throughout the re-action a slight excess of mineral acid remains present. When the combination is completed, the color is made alkaline and a tetrazo solution composed of one molecule of benzidin is added and subsequently one molecule of chlor meta phenylene diamin 1:2:4. The coloring matter so produced exhibits great affinity for vegetable fibers.

As an example of the production of the coloring matter, we give the following:— 128 parts by weight of para chlor anilin are diazotized in the usual manner, and a neutral solution prepared from 341 parts of the acid sodium salt of amido naphthol disulfonic acid (1.8.3.6) (H acid) is poured in. When the combination is complete, the mixture is rendered alkaline, and a tetrazo solution from 184 parts of benzidin is run in, and, subsequently, 143 parts of chlor meta phenylene diamin added. The dyestuff, which is isolated in the usual manner, dyes vegetable fibers deep greenish black shades.

We may replace benzidin by other para diamins, such as tolidin or dianisidin.

Having thus described our invention, what we claim as new and desire to secure by Letters Patent is:—

1. A process for manufacturing a dyestuff which consists in combining one molecule of a diazo chlor benzol with one molecule of amido naphthol disulfonic acid (1.8.3.6) (H acid) in slightly mineral acid solution, then combining the intermediate body thus obtained with one molecule of a tetrazotized para diamin in alkaline solution, and finally adding one molecule of chlor meta phenylene diamin 1:2:4.

2. A process for manufacturing a dyestuff which consists in combining one molecule of a diazo chlor benzol with one molecule of amido naphthol disulfonic acid (1.8.3.6) (H acid) in slightly mineral acid solution, then combining the intermediate body thus obtained with one molecule of tetrazotized benzidin in alkaline solution, and finally adding one molecule of chlor meta phenylene diamin 1:2:4.

In testimony whereof we affix our signatures in the presence of two witnesses.

JOSEPH TURNER.
HARRY DEAN.

Witnesses:
FREDERICK I. BRIGHT,
THOMAS H. BARRON.